US 8,407,985 B2

(12) United States Patent
Singh

(10) Patent No.: US 8,407,985 B2
(45) Date of Patent: Apr. 2, 2013

(54) METHOD OF MONITORING HYDROCARBON LEVELS IN A DIESEL PARTICULATE FILTER

(75) Inventor: Nishant Singh, Carol Stream, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 787 days.

(21) Appl. No.: 12/510,611

(22) Filed: Jul. 28, 2009

(65) Prior Publication Data

US 2011/0023460 A1  Feb. 3, 2011

(51) Int. Cl.
*F01N 3/00* (2006.01)
(52) U.S. Cl. ............... 60/286; 60/274; 60/276; 60/297
(58) Field of Classification Search .............. 60/273, 60/274, 277, 286, 295, 276, 297; F01N 3/36
See application file for complete search history.

(56) References Cited

U.S. PATENT DOCUMENTS

| | | | |
|---|---|---|---|
| 5,950,422 A * | 9/1999 | Dolling ........................... | 60/274 |
| 6,408,616 B1 * | 6/2002 | Mazur et al. .................... | 60/277 |
| 7,308,788 B1 | 12/2007 | Das | |
| 7,433,776 B1 | 10/2008 | Hunter | |
| 7,484,503 B2 | 2/2009 | Wyatt | |
| 7,533,519 B2 | 5/2009 | McNulty | |
| 7,942,043 B2 * | 5/2011 | Liu et al. ..................... | 73/114.75 |
| 2005/0086929 A1 * | 4/2005 | Nieuwstadt et al. ............ | 60/274 |
| 2007/0251218 A1 * | 11/2007 | Driscoll et al. ................. | 60/286 |
| 2008/0000219 A1 * | 1/2008 | Ratcliff et al. .................. | 60/274 |
| 2008/0154478 A1 | 6/2008 | Lyons | |
| 2008/0162022 A1 * | 7/2008 | Groer ........................... | 701/110 |
| 2008/0173008 A1 * | 7/2008 | Kidokoro et al. .............. | 60/277 |
| 2008/0184696 A1 | 8/2008 | Wyatt | |

FOREIGN PATENT DOCUMENTS

JP  2004-324477 A  * 11/2004

OTHER PUBLICATIONS

JP2004-324477A Machine translation.*

* cited by examiner

*Primary Examiner* — Kenneth Bomberg
*Assistant Examiner* — Jason Sheppard
(74) *Attorney, Agent, or Firm* — Mark C. Bach; Jeffrey P. Calfa

(57) ABSTRACT

In a method of determining hydrocarbon slip through a diesel oxidation catalyst for an engine having an electronic control module and an exhaust system having a diesel oxidation catalyst and a diesel particulate filter, the electronic control module receives data indicative of a temperature of a diesel oxidation catalyst input, a temperature of a diesel oxidation catalyst output, and a temperature of a diesel particulate filter output. An energy conversion ratio is calculated with the electronic control module using the data indicative of the temperature of the diesel oxidation catalyst input, the temperature of the diesel oxidation catalyst output, and the temperature of the diesel particulate filter output. The calculated energy conversion ratio is compared to stored energy conversion ratio in a memory accessed by the electronic control module. An estimate of hydrocarbon slip through the diesel oxidation catalyst is generated with the electronic control module based upon the comparison of the calculated energy conversion ratio to stored energy conversion ratio.

14 Claims, 1 Drawing Sheet

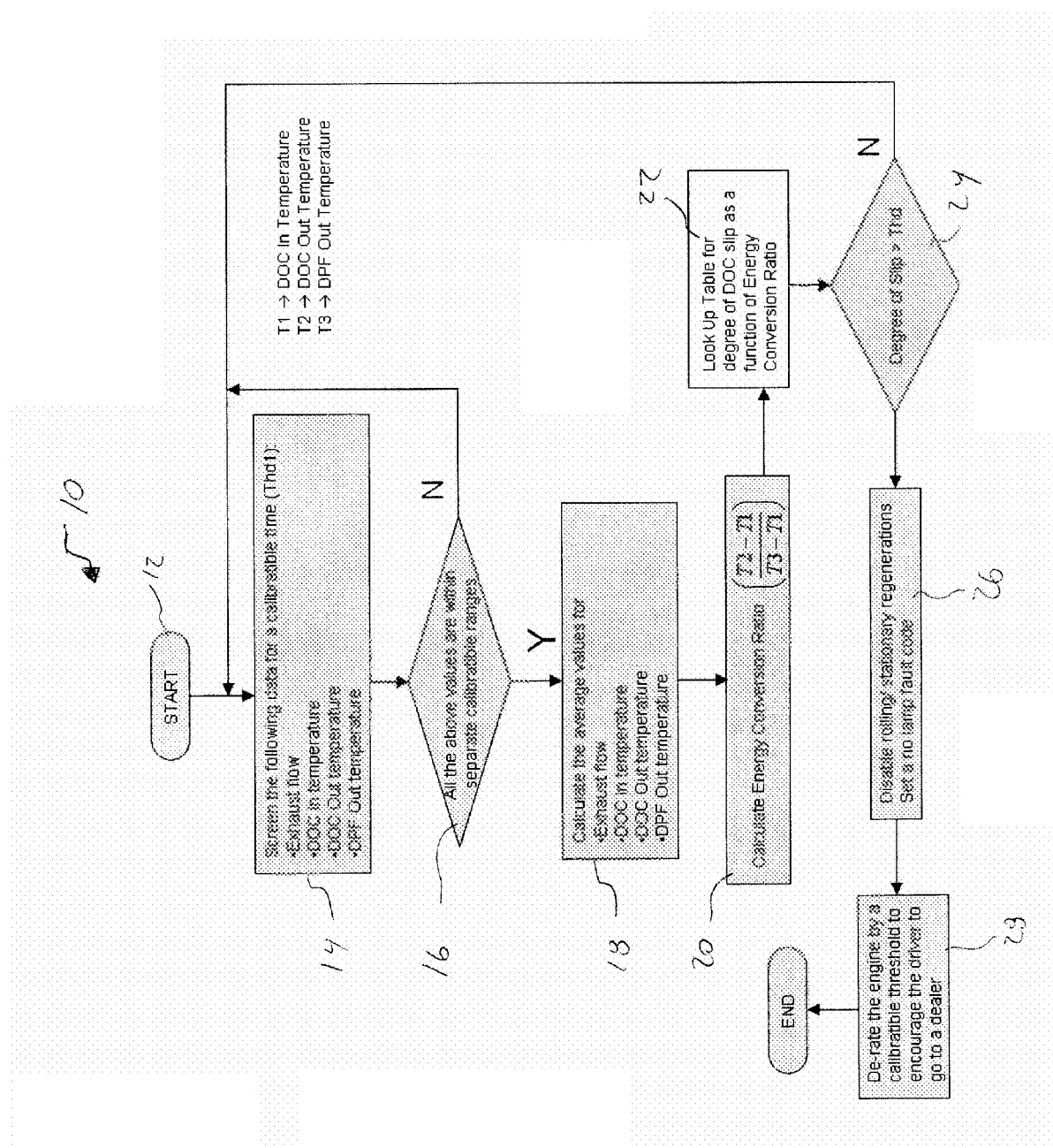

METHOD OF MONITORING HYDROCARBON LEVELS IN A DIESEL PARTICULATE FILTER

TECHNICAL FIELD

The present patent relates to diesel oxidation catalyst, and more particularly to methods for determining hydrocarbon slip over a diesel oxidation catalyst and an electronic control module to control the methods.

BACKGROUND

Many factors, including environmental responsibility efforts and modern environmental regulations on engine exhaust emissions, have reduced the allowable acceptable levels of certain pollutants that enter the atmosphere following the combustion of fossil fuels. Increasingly, more stringent emission standards may require greater control over either or both the combustion of fuel and post combustion treatment of the exhaust. For example, the allowable levels of nitrogen oxides (NOx) and particulate matter have been greatly reduced over the last several years. To address, among other issues, environmental concerns, many diesel engines now have a diesel oxidation catalyst (DOC) as well as a diesel particulate filter (DPF) within an exhaust system of the diesel engine purposed to reduce the amount of unburned hydrocarbons and particulate matter released into the atmosphere.

In some diesel engine operating conditions, such as operating conditions that produce low exhaust temperatures, unburned hydrocarbons may slip over the DOC and lodge within, or on a front face of the DPF. When a regeneration of the DPF is subsequently performed, these additional hydrocarbons may combust and cause the DPF to crack based on the additional heat from the burning of these hydrocarbons that had slipped over the DOC. Additionally, the DOC itself may sometimes become plugged with unburned hydrocarbons, such that the DOC is not functioning properly. Therefore, these unburned hydrocarbons may cause damage to both the DOC and the DPF, resulting in potentially expensive repairs.

Therefore, a need exists for a method of determining when unburned hydrocarbons are accumulating on or within the DOC and the DPF.

SUMMARY

According to one aspect of the present disclosure, a method of monitoring hydrocarbon levels in a diesel particulate filter for an engine having an electronic control module and an exhaust system having a diesel oxidation catalyst and a diesel particulate filter is provided. An electronic control module receives data indicative of a temperature of a diesel oxidation catalyst input, a temperature of a diesel oxidation catalyst output, and a temperature of a diesel particulate filter output. An energy conversion ratio is calculated with the electronic control module using the data indicative of the temperature of the diesel oxidation catalyst input, the temperature of the diesel oxidation catalyst output, and the temperature of the diesel particulate filter output. The calculated energy conversion ratio is compared to stored energy conversion ratio in a memory accessed by the electronic control module. An estimate of hydrocarbon slip through the diesel oxidation catalyst is generated with the electronic control module based upon the comparison of the calculated energy conversion ratio to stored energy conversion ratio.

According to another aspect of the present disclosure, a method of estimating hydrocarbon levels in a diesel particulate filter during a diesel particulate filter regeneration, the diesel engine having an electronic control module, a diesel oxidation catalyst, and a diesel particulate filter is provided. A diesel particulate filter regeneration cycle is initiated. An energy conversion ratio is calculated with the electronic control module using data indicative of a temperature of the diesel oxidation catalyst input, a temperature of the diesel oxidation catalyst output, and a temperature of the diesel particulate filter output. An estimate of hydrocarbon slip through the diesel oxidation catalyst is generated with the electronic control module based upon the energy conversion ratio. The diesel particulate filter regeneration cycle is disabled when the estimate of hydrocarbon slip through the diesel oxidation catalyst exceeds a threshold value.

According to a further aspect of the present disclosure, a method for calculating an energy conversion ratio of a diesel oxidation catalyst and a diesel particulate filter for a diesel engine having the diesel oxidation catalyst, the diesel particulate filter, and an electronic control module is provided. A temperature of an inlet of the diesel oxidation catalyst is presented to the electronic control module. A temperature of an outlet of the diesel oxidation catalyst is provided to the electronic control module. A temperature of an outlet of the diesel particulate filter is delivered to the electronic control module. An energy conversion ratio is calculated with the electronic control module using the following formula:

$$\text{Energy Conversion Ratio} = \frac{T2 - T1}{T3 - T1},$$

where T1 is a temperature at the diesel oxidation catalyst input, T2 is a temperature at the diesel oxidation catalyst output, and T3 is a temperature at the diesel particulate filter output.

BRIEF DESCRIPTION OF THE DRAWINGS

The Figure is a flow diagram depicting a method of controlling an engine for determining slip of unburned hydrocarbons through a diesel oxidation catalyst and into a diesel particulate filter using an electronic control module.

DETAILED DESCRIPTION

While the processes of the present invention may be implemented in many different forms, there is shown in the drawing and will herein be described in detail certain processes with the understanding that the present disclosure is to be considered as an exemplification of the principles of the processes of the present invention and is not intended to limit the broad aspects of the processes to the specific processes illustrated and described herein.

According to one process as shown in the Figure, a method 10 of controlling an engine for determining slip of unburned hydrocarbons through a diesel oxidation catalyst (DOC) during a diesel particulate filter (DPF) regeneration cycle is shown. The method is implemented by an electronic control module (ECM) of the engine and is initiated at block 12. As an aspect of the process 10, the ECM receives a reading of certain data from the engine over a period of time as shown at block 14. The data the ECM receives may include an exhaust flow rate, a temperature at an inlet of the DOC, a temperature at an outlet of the DOC, and a temperature at an outlet of a diesel particulate filter (DPF). The exhaust flow rate may be utilized to determine if the engine is operating in a transient manner, or in a steady-state manner.

The method is initiated at block 12 and the ECM compares the data received from the engine 14 to stored calibration ranges at block 16. The calibration ranges may be stored in a memory of the ECM, or may be contained on a computer readable medium that is read by the ECM. If the ECM determines that any of the engine data are outside of the stored calibration range, the method is restarted and new data is received at block 14. If the data is within the calibration ranges, averages of the data received are generated.

The ECM generates average values for the data as shown at block 18. The averages calculated will include an average temperature at the inlet of the DOC, an average temperature at the outlet of the DOC, and an average temperature of the outlet of the DPF.

Once the average values of the data have been calculated, an energy conversion ratio is calculated at block 20.

The energy conversion ratio is calculated using the following formula:

$$\text{Energy Conversion Ratio} = \frac{T2 - T1}{T3 - T1}$$

Wherein T1 is the average temperature at the inlet of the DOC, T2 is the average temperature at the outlet of the DOC, and T3 is the average temperature of the outlet of the DPF. The energy conversion ratio calculates a ratio of energy conversion within the DOC to energy conversion within both the DOC and the DPF during a regeneration cycle of the DPF. Once the energy conversion ratio has been determined, the ECM compares the energy conversion ratio to stored energy conversion ratios in the memory of the ECM, or within a computer readable medium accessed by the ECM, to determine an amount of hydrocarbon slip through the DOC at block 22.

Next, the ECM compares the amount of hydrocarbon slip through the DOC determined based upon the energy conversion ratio to a threshold amount of hydrocarbon slip through the DOC, as shown at block 24. If the amount of hydrocarbon slip through the DOC is less than the threshold, the method again obtains data as shown at block 14. However, if the amount of hydrocarbon slip through the DOC is above the threshold, the ECM controls the engine such that the DPF regeneration is discontinued as depicted at block 26. Additionally, a fault code may be placed into the memory of the ECM at block 26 in order to allow a technician to more readily identify a need to service the engine.

Further, once the regeneration of the DPF has been disabled, engine power output may be de-rated, or reduced, to prevent damage to the engine from occurring, as shown at block 28. In addition to preventing damage to the engine, de-rating the engine power output will encourage a vehicle operator to seek service for the engine. Therefore, in addition to de-rating the engine power output, it is contemplated that the vehicle operator may receive an error message, or a service engine soon light may be illuminated, to inform the vehicle operator that the engine needs service.

While the specific embodiments have been illustrated and described, numerous modifications come to mind without significantly departing from the spirit of the invention, and the scope of protection is only limited by the scope of the accompanying Claims.

What is claimed is:

1. A method of monitoring hydrocarbon levels in a diesel particulate filter for an engine having an electronic control module and an exhaust system having a diesel oxidation catalyst and a diesel particulate filter, method comprising:
   receiving in an electronic control module data indicative of a temperature of a diesel oxidation catalyst input, a temperature of a diesel oxidation catalyst output, and a temperature of a diesel particulate filter output;
   calculating an energy conversion ratio with the electronic control module using the data indicative of the temperature of the diesel oxidation catalyst input, the temperature of the diesel oxidation catalyst output, and the temperature of the diesel particulate filter output;
   comparing the calculated energy conversion ratio to a stored energy conversion ratio in a memory accessible by the electronic control module; and
   generating an estimate of hydrocarbon slip through the diesel oxidation catalyst based upon the comparison of the calculated energy conversion ratio to the stored energy conversion ratio wherein the calculated energy conversion ratio is generated using the following formula:

$$\text{Energy Conversion Ratio} = \frac{T2 - T1}{T3 - T1}$$

wherein T1 is a temperature at the diesel oxidation catalyst input, T2 is a temperature at the diesel oxidation catalyst output, and T3 is a temperature at the diesel particulate filter output.

2. The method of claim 1, wherein the data indicative of the temperature of the diesel oxidation catalyst input, the temperature of the diesel oxidation catalyst output, and the temperature of the diesel particulate filter output received are averaged for a period of time before calculating the energy conversion ratio.

3. The method of claim 1 further comprising:
   receiving in the electronic control module data indicative of an exhaust flow rate of the engine; and
   determining whether the engine is operating in one of either a transient manner or a steady-state manner based upon the exhaust flow rate data.

4. The method of claim 1, wherein the memory accessible by the electronic control module is disposed within the electronic control module.

5. The method of claim 1, further comprising:
   comparing the data indicative of the temperature of the diesel oxidation catalyst input, the temperature of the diesel oxidation catalyst output, and the temperature of the diesel particulate filter output to stored calibration data ranges.

6. A method of estimating hydrocarbon levels in a diesel particulate filter during a diesel particulate filter regeneration, the diesel engine having an electronic control module, a diesel oxidation catalyst, and a diesel particulate filter, the method comprising:
   initiating a diesel particulate filter regeneration cycle;
   calculating an energy conversion ratio with the electronic control module using data indicative of a temperature of the diesel oxidation catalyst input, a temperature of the diesel oxidation catalyst output, and a temperature of the diesel particulate filter output;
   generating an estimate of hydrocarbon slip through the diesel oxidation catalyst with the electronic control module based upon the energy conversion ratio; and disabling the diesel particulate filter regeneration cycle when the estimate of hydrocarbon slip through the diesel oxidation catalyst exceeds a threshold value wherein the calculated energy conversion ratio is generated using the following formula:

$$\text{Energy Conversion Ratio} = \frac{T2 - T1}{T3 - T1}$$

wherein T1 is a temperature at the diesel oxidation catalyst input, T2 is a temperature at the diesel oxidation catalyst output, and T3 is a temperature at the diesel particulate filter output.

7. The method of claim 6 further comprising:
receiving in the electronic control module data indicative of a temperature of a diesel oxidation catalyst input, a temperature of a diesel oxidation catalyst output, and a temperature of a diesel particulate filter output.

8. The method of claim 6 further comprising:
reducing engine power output when the estimate of hydrocarbon slip through the diesel oxidation catalyst exceeds the threshold value.

9. The method of claim 6 further comprising:
receiving in the electronic control module data indicative of an exhaust flow rate of the engine; and
determining whether the engine is operating in a transient manner or a steady-state manner based upon the exhaust flow rate data, wherein the calculating the energy conversion ratio with the electronic control module is performed only when the engine is operating in a steady-state manner.

10. The method of claim 6 further comprising:
setting a fault code in the electronic control module when the estimate of hydrocarbon slip through the diesel oxidation catalyst exceeds a threshold value.

11. The method of claim 6, wherein the estimate of hydrocarbon slip through the diesel oxidation catalyst is generated by comparing the calculated energy conversion ratio to stored energy conversion ratios in a memory accessed by the electronic control module.

12. A method for calculating an energy conversion ratio of a diesel oxidation catalyst and a diesel particulate filter for a diesel engine having the diesel oxidation catalyst, the diesel particulate filter, and an electronic control module, the method comprising:
presenting a temperature of an inlet of the diesel oxidation catalyst to the electronic control module;
providing a temperature of an outlet of the diesel oxidation catalyst to the electronic control module;
delivering a temperature of an outlet of the diesel particulate filter to the electronic control module; and
calculating an energy conversion ratio with the electronic control module using the following formula:

$$\text{Energy Conversion Ratio} = \frac{T2 - T1}{T3 - T1}$$

wherein T1 is a temperature at the diesel oxidation catalyst input, T2 is a temperature at the diesel oxidation catalyst output, and T3 is a temperature at the diesel particulate filter output.

13. The method of claim 12 further comprising:
receiving in the electronic control module data indicative of an exhaust flow rate of the engine; and
determining whether the engine is operating in a transient manner or a steady-state manner based upon the exhaust flow rate data, wherein the calculating the energy conversion ratio is performed when the engine is operating in the steady-state manner.

14. The method of claim 12 further comprising:
averaging the data indicative of the temperature of the diesel oxidation catalyst input, the temperature of the diesel oxidation catalyst output, and the temperature of the diesel particulate filter output received for a period of time before calculating the energy conversion ratio.

\* \* \* \* \*